United States Patent
Limpert

(10) Patent No.: US 10,640,092 B2
(45) Date of Patent: May 5, 2020

(54) WINDOW WASH NOZZLE

(71) Applicant: ILLINOIS TOOL WORKS INC., Glenview, IL (US)

(72) Inventor: Alexander Limpert, Weikersheim (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 60 days.

(21) Appl. No.: 16/092,079

(22) PCT Filed: Apr. 13, 2017

(86) PCT No.: PCT/US2017/027356
§ 371 (c)(1),
(2) Date: Oct. 8, 2018

(87) PCT Pub. No.: WO2017/184421
PCT Pub. Date: Oct. 26, 2017

(65) Prior Publication Data
US 2019/0161061 A1    May 30, 2019

(30) Foreign Application Priority Data
Apr. 22, 2016 (DE) .......................... 10 2016 107 544

(51) Int. Cl.
*B60S 1/52* (2006.01)

(52) U.S. Cl.
CPC .................. *B60S 1/522* (2013.01); *B60S 1/52* (2013.01)

(58) Field of Classification Search
CPC .................................... B60S 1/522; B60S 1/52
(Continued)

(56) References Cited

U.S. PATENT DOCUMENTS

| 3,230,564 A | * | 1/1966 | McDevitt ................ B60S 1/528 239/284.1 |
| 6,152,385 A | * | 11/2000 | Nuber .................... B60S 1/528 239/284.1 |

(Continued)

FOREIGN PATENT DOCUMENTS

| DE | 202010013930 | 1/2012 |
| KR | 20020058113 | 7/2002 |
| WO | WO 2015/119777 | 8/2015 |

OTHER PUBLICATIONS

PCT, International Search Report and Written Opinion, International Application No. PCT/US2017/027356; dated Sep. 6, 2017, 12 pages.

*Primary Examiner* — Steven J Ganey
(74) *Attorney, Agent, or Firm* — Thompson Hine LLP

(57) ABSTRACT

A window wash nozzle for a vehicle includes a housing in which a nozzle element is pivotably mounted about a pivot axis. Actuation of an adjustment element pivots the nozzle element. A sliding piece mounted in an axially displaceable manner in the housing interacts with the adjustment element such that actuation of the adjustment element brings about an axial displacement of the sliding piece. A guiding cam is formed on the sliding piece and interacts with a transmission element such that the transmission element is adjusted in a direction transversely with respect to the direction of movement of the sliding piece during axial displacement of the sliding piece. The transmission element acts on the nozzle element excentrically with respect to the pivot axis of the nozzle element such that an adjustment of the transmission element brings about pivoting of the nozzle element about the pivot axis.

12 Claims, 4 Drawing Sheets

Figure 1:
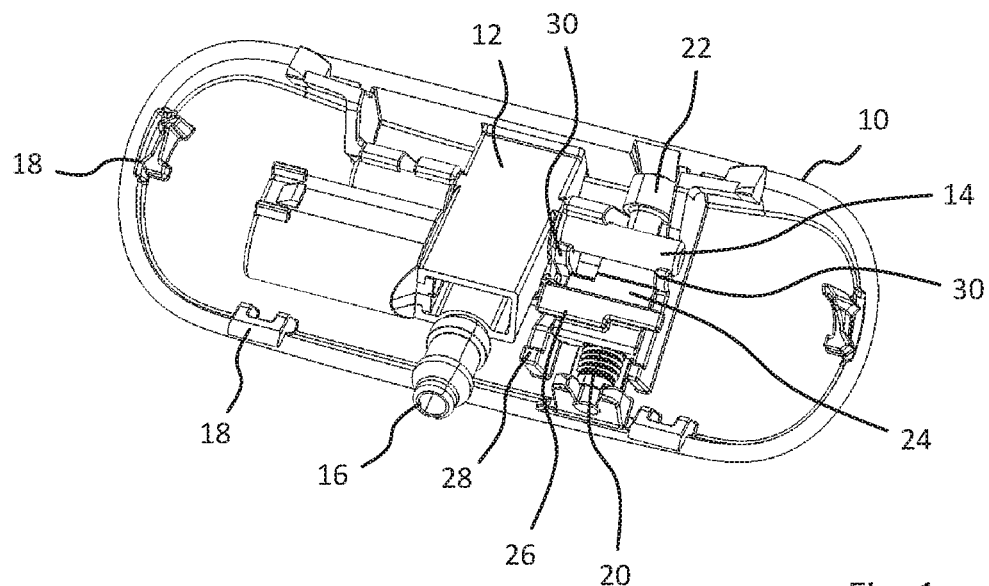

(58) Field of Classification Search
USPC ........ 239/284.1, 284.2, 203, 288; 15/250.04, 15/250.351
See application file for complete search history.

(56) References Cited

U.S. PATENT DOCUMENTS

| | | | | |
|---|---|---|---|---|
| 6,854,666 | B2 * | 2/2005 | Jenkins | B60S 1/603 |
| | | | | 239/284.2 |
| 7,448,554 | B2 * | 11/2008 | Sakai | B60S 1/528 |
| | | | | 239/284.1 |

* cited by examiner

WINDOW WASH NOZZLE

The invention relates to a window wash nozzle for a vehicle, comprising a housing in which a nozzle element which is connectable to a liquid supply is mounted so as to be pivotable about a pivot axis, and comprising an adjustment element, the actuation of which brings about pivoting of the nozzle element.

Window wash nozzles of this type are used, for example, for cleaning the windows of cars. In order to adjust the window wash nozzle, in particular the striking location on the window to be cleaned, it is known to mount the nozzle element pivotably in the housing. To adjust the pivoting position, an adjustment screw is provided which acts on an extension formed on the pivot axis of the nozzle element. By rotation of the adjustment screw, the latter is moved forward or back in the axial direction and thereby pivots the nozzle element about the pivot axis via the extension. It is disadvantageous that only a relatively rough adjustment of the pivoting position is possible. Thus, in the case of known systems, a revolution of the screw already causes, for example, pivoting of the nozzle element by ±5°. In addition, a movement play between the adjustment screw and extension and therefore of the nozzle element is unavoidably associated with the transmission of the axial movement of the adjustment screw into a pivoting movement of the extension and therefore of the nozzle element. This movement play can lead during operation of the window wash nozzle, in particular at the beginning of a spraying operation, to an undesirable adjustment of the position of the nozzle element.

Starting from the explained prior art, the invention is based on the object of providing a window wash nozzle of the type mentioned at the beginning, said window wash nozzle permitting fine adjustment of the pivoting position of the nozzle element and avoiding an undesirable adjustment of the position of the nozzle element.

The invention achieves the object by the subject matter of independent claim 1. Advantageous refinements are found in the dependent claims, the description and the figures.

For a window wash nozzle of the type mentioned at the beginning, the invention achieves the object in that a sliding piece is mounted in an axially displaceable manner in the housing and interacts with the adjustment element in such a manner that actuation of the adjustment element brings about an axial displacement of the sliding piece, and in that a guiding cam is formed on the sliding piece and interacts with a transmission element in such a manner that the transmission element is adjusted in a direction transversely with respect to the direction of movement of the sliding piece during axial displacement of the sliding piece, wherein the transmission element acts on the nozzle element excentrically with respect to the pivot axis of the nozzle element such that an adjustment of the transmission element brings about pivoting of the nozzle element about the pivot axis.

As mentioned, window wash nozzles are used, for example, for cleaning the windows of cars. For this purpose, the housing of the window wash nozzle is fastened in a suitable manner to the vehicle, for example by latching. During the operation, the nozzle element is connected under pressure to a liquid supply for washing liquid such that the washing liquid is discharged by the nozzle element onto the window to be cleaned. The nozzle element here can discharge a fan-shaped liquid jet or liquid jet oscillating in a fan-shaped manner. However, it can also produce a punctiform liquid jet.

According to the invention, a sliding piece is mounted in an axially displaceable manner in the housing of the window wash nozzle. An adjustment element acts on the sliding piece, wherein actuation of the adjustment element displaces the sliding piece forward or back axially in the housing. Furthermore, a transmission element is provided which interacts with a guiding cam of the sliding piece in such a manner that an axial displacement of the sliding piece in the housing adjusts the transmission element transversely with respect to the axial direction of movement of the sliding piece. When it is discussed here that the transmission element is adjusted transversely with respect to the direction of movement of the sliding piece, this means that the transmission element has a movement component running transversely with respect to the direction of movement of the sliding piece. It can furthermore also have a movement component in another direction. However, it is also possible for the transmission element only to have a movement component transversely or perpendicularly with respect to the direction of movement of the sliding piece. The transmission element acts on the nozzle element excentrically with respect to the pivot axis, and therefore the nozzle element is pivoted forward and/or back by the movement of the transmission element taking place transversely with respect to the direction of movement of the sliding piece. The sliding piece therefore forms a carriage or a sliding block of a slotted-guide control means.

In this manner, according to the invention, firstly a gearing step-down is realized, and therefore a finer adjustment of the pivoting position of the nozzle element is possible in comparison to the prior art explained at the beginning. The degree of precision can be flexibly selected in a desired manner by a corresponding design of the guide cam of the sliding piece. In addition to the finer adjustment of the pivoting position of the nozzle element, the invention realizes a further important advantage. Thus, according to the invention, the adjustment element does not act directly on the pivot axis of the nozzle element, but rather indirectly via the transmission element interacting with the guide curve of the sliding piece. In contrast to the prior art explained at the beginning, the adjustment element therefore does not transmit the forces required for adjustment of the pivoting position directly to the pivot axis of the nozzle element. As a result, the movement play of the nozzle element, which movement play is unavoidable in the prior art explained at the beginning, and the associated risk of an undesirable adjustment of the nozzle element position can be reliably avoided. The construction according to the invention of the window wash nozzle is therefore also particularly robust.

The sliding piece can be formed integrally, for example from a plastic. For example, it can be produced in a plastic injection molding process. The nozzle element and/or the housing can also be formed integrally, for example from a plastic, produced, for example, in a plastic injection molding process. The adjustment element can also be formed integrally. It can be composed, for example, of a plastic or a metal material. The pivot axis of the nozzle element can be a cylinder axis integrally formed on the nozzle element. The transmission element can be an integral part of the nozzle element or can be formed separately therefrom.

According to a particularly practical refinement, the adjustment element can be an adjustment screw which is mounted in a rotatable and axially fixed manner in the housing. The sliding piece can have a thread which is in engagement with the thread of the adjustment screw and is mounted for rotation therewith and in an axially displaceable manner in the housing. The sliding piece here is arranged in particular on the adjustment screw. The external thread of the adjustment screw is then in engagement with an internal thread of the sliding piece in the manner of a spindle drive. The internal thread of the sliding piece can have been introduced previously into the sliding piece. However, it is also conceivable for the internal thread to be introduced in a self-cutting manner by the adjustment screw itself as it is being screwed into the sliding piece. Rotation of the adjustment screw in the internal thread during operation then correspondingly brings about an axial movement of the sliding piece in one direction or in the opposite direction, depending on the direction of rotation of the adjustment screw. The sliding piece is moved here in the direction of the longitudinal axis of the adjustment screw. As explained above, it is possible, by means of a suitable design of the guiding cam on the sliding piece, to select the degree of precision of the adjustment in a suitable manner. For example, it can be provided that, for an adjustment of the pivoting position of the nozzle element by ±5° from a zero position, at least five revolutions of the adjustment screw, for example seven revolutions of the adjustment screw, are required.

According to a further refinement, the guiding cam can be formed by a guiding groove formed on the sliding piece. The transmission element can be a transmission pin which is attached to the nozzle element excentrically with respect to the pivot axis and is guided in the guiding groove. As already explained, the transmission pin can be attached integrally to the nozzle element or can be attached to the nozzle element as a separate part. The guiding groove is formed, for example, on an outer surface of the sliding piece. The transmission pin runs into said guiding groove during an axial movement of the sliding piece. The transmission pin can be cylindrical, for example. Its longitudinal axis can run parallel to the pivot axis of the nozzle element.

The guiding groove can run at least in sections at an angle to the movement axis of the sliding piece. The adjustment of the transmission element transversely with respect to the direction of movement of the sliding piece is thereby achieved in a particularly simple manner. By suitable selection of the pitch of the guiding cam or of the angle of the guiding cam with respect to the movement axis of the sliding piece, the degree of the gearing step-down achieved by the slotted-guide control means according to the invention can be selected flexibly.

According to a further refinement, the transmission pin can be guided in the guiding groove without play, preferably with an oversize. The transmission pin therefore fully sits, preferably with a slight interference fit, in the guide groove. Movement play between the transmission pin and the sliding piece is thereby avoided, and the risk of an undesirable adjustment of the position of the nozzle element, for example at the beginning of a spraying operation, can be further reduced. Owing to the relatively high forces transmittable by the sliding piece and the adjustment screw, the adjustment according to the invention of the nozzle element is nevertheless easily possible.

Furthermore, a retaining groove in which a projection of the housing is guided during an axial displacement of the sliding element can furthermore be formed in the sliding piece. The retaining groove can run parallel to the movement axis of the sliding piece. It provides additional stabilization or reinforcement of the arrangement, in particular in a direction perpendicular to the direction of movement of the sliding piece. This applies in particular if the projection of the housing is guided in the retaining groove without play, preferably with an oversize. A movement play between the sliding piece and the housing is then reliably eliminated and therefore the risk of an undesirable adjustment of the nozzle position is further reduced.

According to a further refinement, it can be provided that the housing has stop surfaces, and that the sliding piece has stop surfaces. The stop surfaces of the housing then interact with the stop surfaces of the sliding piece to limit the axial movement of the sliding piece. The movement of the sliding piece in both directions and therefore the adjustment range of the nozzle element in both directions can thereby be restricted in a simple manner.

Figure 2:
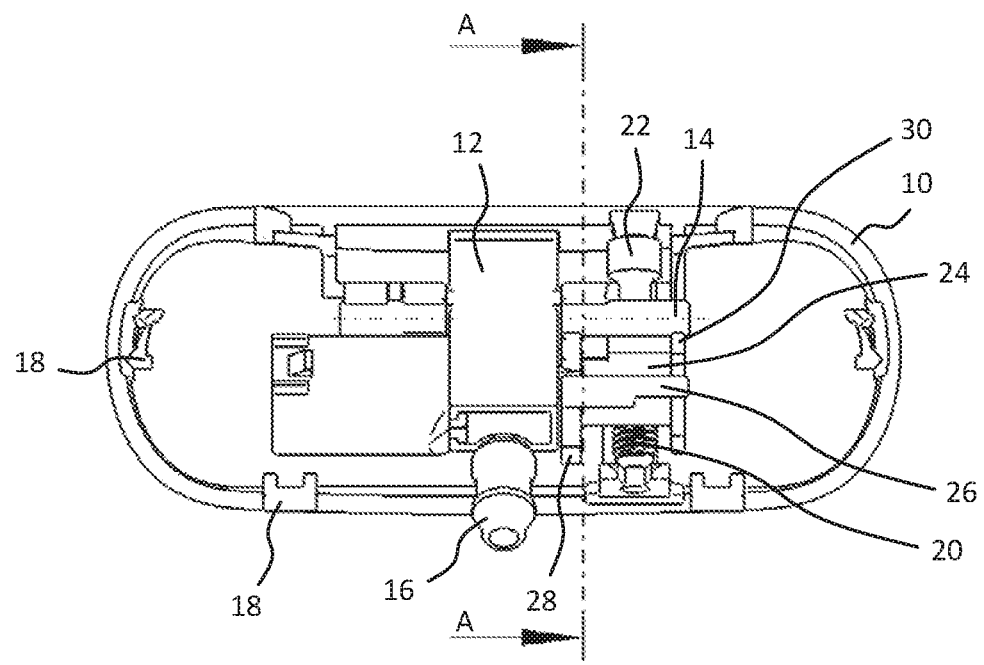
Figure 3:
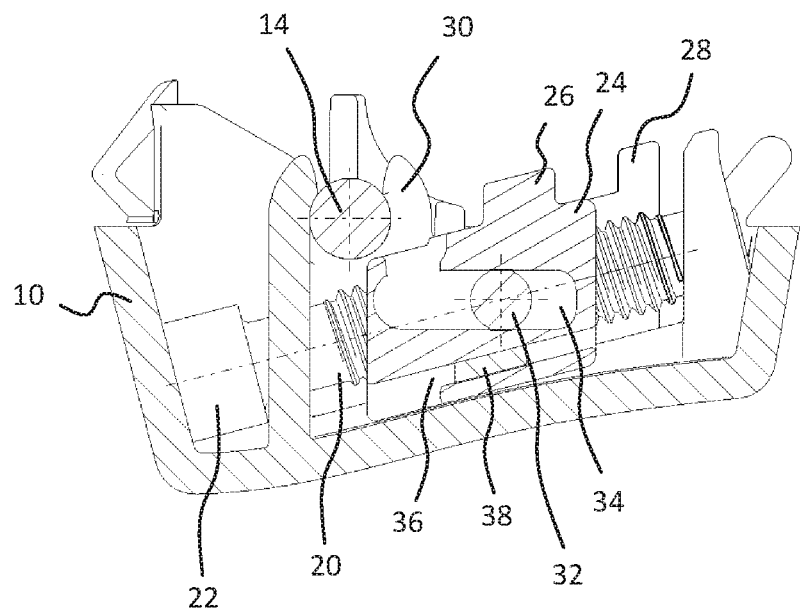
Figure 4:
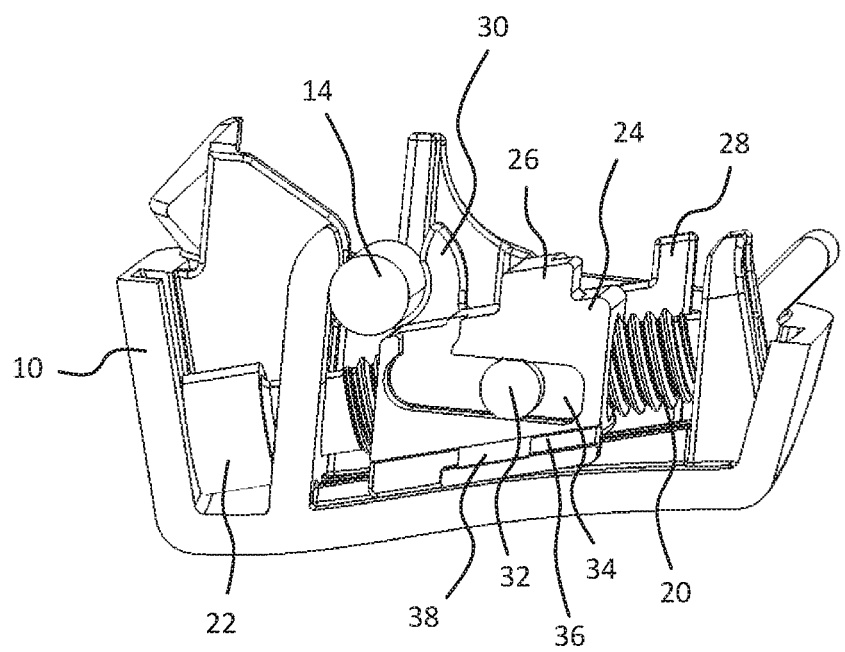
Figure 5:
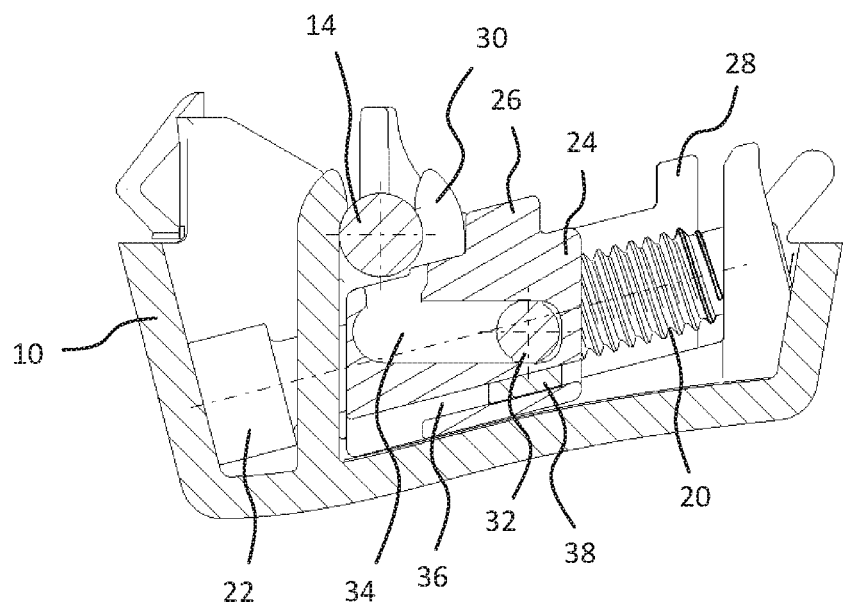
Figure 6:
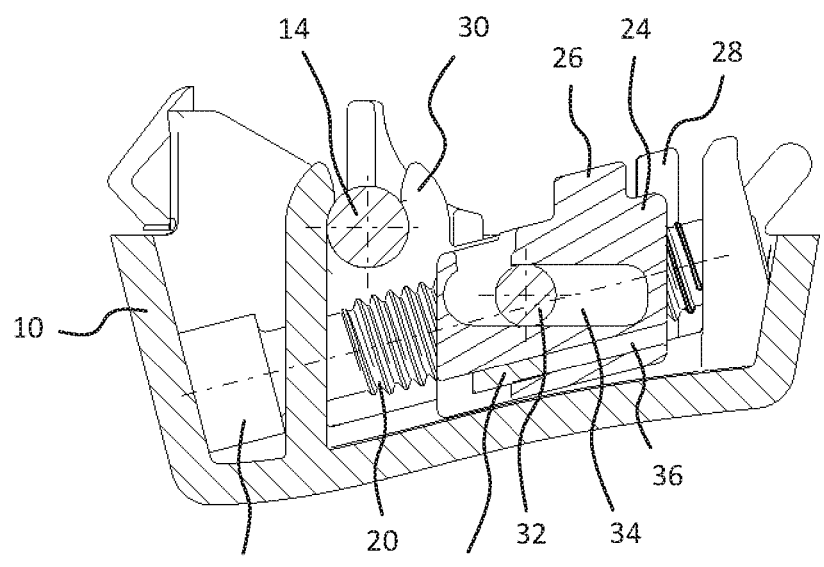
Figure 7:
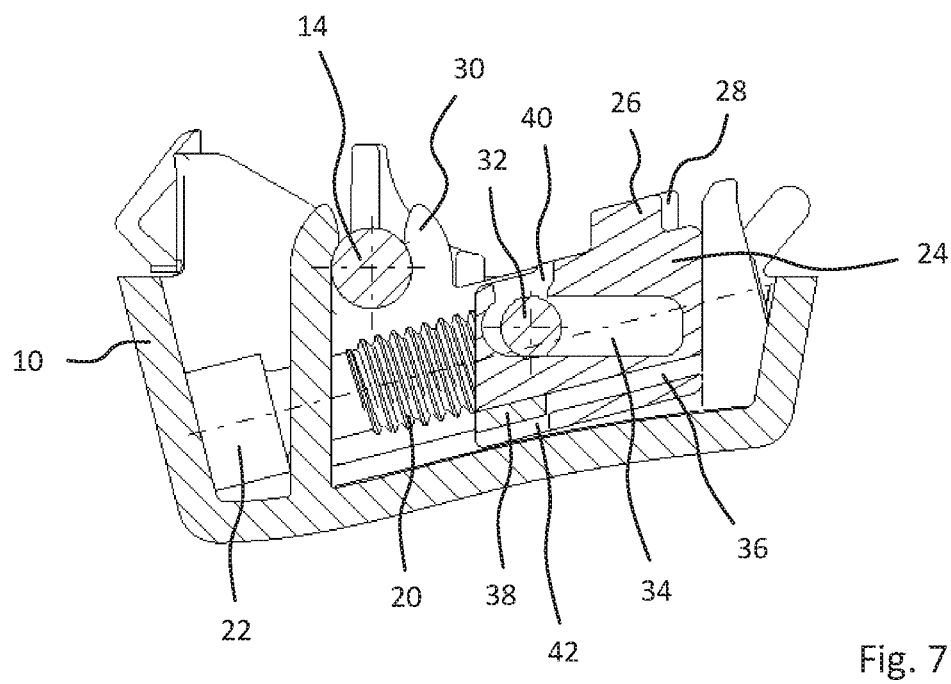

An exemplary embodiment of the invention is explained in more detail below with reference to figures, in which, schematically:

FIG. 1 shows a window wash nozzle according to the invention in a perspective view, FIG. 2 shows a top view of the window wash nozzle shown in FIG. 1, FIG. 3 shows a sectional view along the line A-A in FIG. 2 in a first operating state of the window wash nozzle, FIG. 4 shows a perspective illustration of the view from FIG. 3, FIG. 5 shows the illustration from FIG. 3 in a second operating state of the window wash nozzle, FIG. 6 shows the illustration from FIG. 3 in a third operating state of the window wash nozzle, and FIG. 7 shows the illustration from FIG. 3 in a fourth operating state of the window wash nozzle.

Unless stated otherwise, the same reference signs refer to the same objects in the figures.

The window wash nozzle illustrated in FIGS. 1 and 2 comprises a housing 10 in which a nozzle element 12 is mounted so as to be pivotable about a cylindrical pivot axis 14 integrally formed on the nozzle element 12. The nozzle element 12 has a connection 16 for connecting to a liquid supply for washing liquid under pressure. At the opposite end of the nozzle element 12 there is an outlet opening, which cannot be seen in FIGS. 1 and 2, of the nozzle element 12, via which outlet opening the washing liquid supplied by the liquid supply is discharged, for example onto a window of a car. The window wash nozzle is fastened by the housing 10 via latching projections 18 to the car in a suitable manner. The nozzle element 12 can discharge, for example, a fan-shaped liquid jet or liquid jet oscillating in a fan-shaped manner or a punctiform liquid jet. This is known per se and will not be explained in more detail.

An adjustment screw 20 with an external thread is mounted in a rotatable and axially fixed manner in the housing 10. The head of the adjustment screw can be seen at the reference sign 22. It has suitable engagement means via which the adjustment screw 20 can be rotated, for example, manually by means of a suitable tool in the clockwise direction or counterclockwise. A sliding piece 24 is mounted on the adjustment screw 20 for rotation therewith and so as to be displaceable axially in the direction of the longitudinal axis of the adjustment screw 20. For this purpose, the sliding piece 24 has an internal thread which meshes with the external thread of the adjustment screw 20. Rotation of the adjustment screw 20 in the clockwise direction or counterclockwise brings about an axial displacement of the sliding piece 24 forward or back in the manner of a spindle drive. A stop projection 26 which forms two mutually opposite stop surfaces is formed on the sliding piece 24. Stop projections 28, 30 which likewise form stop surfaces are likewise formed on the housing 10. The stop projections 30 serve here at the same time for holding the pivot axis 14 of the nozzle element 12. By interaction of the stop surfaces of the stop projection 26 of the sliding piece 24 with the stop surfaces of the stop projections 28, 30 of the housing 10, the axial movement of the sliding piece 24 in both directions is restricted.

A transmission element which is likewise formed integrally on the nozzle element 12, in the present case a cylindrical transmission pin, can be seen at the reference sign 32. A guiding cam in the form of a guiding groove 34 in which the transmission piece 32 is guided during an axial movement of the sliding piece 24 is formed on the sliding piece 24. As can be seen in particular in FIGS. 3 to 7, the guiding groove 34 runs at an angle in relation to the direction of movement of the sliding piece 24, which direction of movement, as explained, runs along the longitudinal axis of the adjustment screw 20. In the examples illustrated, this angle is approximately 15°. However, other angles are also possible depending on the desired step-down ratio to be realized. A retaining groove 36 which runs parallel to the longitudinal axis of the adjustment screw 20 and in which a projection 38 of the housing 10 is guided during an axial movement of the sliding piece 24 is further formed in the sliding piece 24. The guiding groove 34 has an installation opening 40 through which the transmission pin 32 passes into the guiding groove 34 during the installation of the window wash nozzle, and the retaining groove 36 has an installation opening 42 via which the projection 38 of the housing 10 enters the retaining groove 36 during the installation of the window wash nozzle. This installation position is illustrated in FIG. 7. In the example shown, the transmission pin 32 is guided in the guiding groove 34 without play, preferably with a slight oversize, and the projection 38 of the housing 10 is guided in the retaining groove 36 without play, preferably with a slight oversize.

The adjustment according to the invention of the pivoting position of the nozzle element 12 will be explained with reference to FIGS. 3 to 6. FIGS. 3 and 4 show the nominal position (zero position) which is set after the installation of the window wash nozzle and is also shown in FIGS. 1 and 2. The sliding piece 24 is located approximately centrally in respect of its adjustment path on the adjustment screw 20. The transmission pin 32 is located with its center approximately on the longitudinal axis of the adjustment screw 20. By rotation of the adjustment screw 20 in the clockwise direction, the sliding piece 24 can be displaced to the left along the longitudinal axis of the adjustment screw 20 in FIG. 3 until the first maximum position shown in FIG. 5 is reached. In this maximum position, the stop projection 26 of the sliding piece 24 strikes against the stop projection 30 of the housing 10. As can be seen from a comparison of FIGS. 3 and 5, the transmission pin 32 is adjusted here in a direction transversely with respect to the direction of movement of the adjustment element 24, downward in FIG. 5. Since the transmission pin 32, as can be seen in the figures, acts on the nozzle element 12 excentrically with respect to the pivot axis 14, this movement of the transmission pin 32 leads to pivoting of the nozzle element 12 about the pivot axis 14. If the adjustment screw 20 is rotated counterclockwise, the sliding piece 24 is moved in the opposite direction, i.e. to the right in FIG. 5, into the position shown in FIG. 6. As can be seen from a comparison of FIGS. 6 and 3, the transmission pin 32 is adjusted here in an opposite direction transversely with respect to the direction of movement of the sliding piece 24, upward in FIG. 6. This correspondingly results in a pivoting of the nozzle element 12 about the pivot axis 14 in the opposite direction. If the adjustment screw 20 is rotated counterclockwise further out of the position shown in FIG. 6, the sliding piece 24 is moved further to the right in FIG. 6 until the installation position shown in FIG. 7 is reached. In this second maximum position of the sliding piece 24, the stop projection 26 of the sliding piece 24 strikes against the stop projection 28 of the housing 10. During normal operation, the position shown in FIG. 6 is not intended to be exceeded.

The angular range between the positions shown in FIGS. 5 and 6 can be adjusted in the desired manner by suitable configuration in particular of the guiding groove 34, namely of the pitch or angle thereof in relation to the direction of movement of the sliding piece 24. In the example illustrated, the positions of the sliding piece 24 that are shown in FIGS. 5 and 6 in relation to the zero position shown in FIG. 3 result in pivoting of the nozzle element 12 by ±5°. It can be provided, for example, that, starting from the zero position shown in FIG. 3, at least five, preferably seven revolutions of the adjustment screw 20 are in each case required in order to reach the position shown in FIG. 5 or FIG. 6.

LIST OF REFERENCE SIGNS

10 Housing
12 Nozzle element
14 Pivot axis
16 Connection
18 Latching projections
20 Adjustment screw
22 Head
24 Sliding piece
26 Stop projection
28 Stop projection
30 Stop projection
32 Transmission pin
34 Guiding groove
36 Retaining groove
38 Projection
40 Installation opening
42 Installation opening

The invention claimed is:

1. A window wash nozzle for a vehicle, comprising a housing in which a nozzle element which is connectable to a liquid supply is mounted so as to be pivotable about a pivot axis, and comprising an adjustment element which is actuatable to bring about pivoting of the nozzle element, wherein a sliding piece is mounted in an axially displaceable manner in the housing and interacts with the adjustment element in such a manner that actuation of the adjustment element brings about an axial displacement of the sliding piece, and in that a guiding cam is formed on the sliding piece and interacts with a transmission element in such a manner that the transmission element is adjusted in a direction transversely with respect to a direction of movement of the sliding piece during axial displacement of the sliding piece, wherein the transmission element acts on the nozzle element eccentrically with respect to the pivot axis of the nozzle element such that adjustment of the transmission element brings about pivoting of the nozzle element about the pivot axis.

2. The window wash nozzle as claimed in claim 1, wherein the adjustment element is an adjustment screw that is mounted in a rotatable and axially fixed manner in the housing, wherein the sliding piece has a thread which is in engagement with a thread of the adjustment screw and is mounted for rotation therewith and in an axially displaceable manner in the housing.

3. The window wash nozzle as claimed in claim 1, wherein the guiding cam is formed by a guiding groove formed on the sliding piece, and in that the transmission element is a transmission pin which is attached to the nozzle element eccentrically with respect to the pivot axis and is guided in the guiding groove.

4. The window wash nozzle as claimed in claim 3, wherein the guiding groove runs at least in sections at an angle to the movement axis of the sliding piece.

5. The window wash nozzle as claimed in claim 3, wherein the transmission pin is guided in the guiding groove without play and with an oversize.

6. The window wash nozzle as claimed in claim 1, wherein a retaining groove in which a projection of the housing is guided during an axial displacement of the sliding element is formed on the sliding piece.

7. The window wash nozzle as claimed in claim 6, wherein the projection of the housing is guided in the retaining groove without play and with an oversize.

8. The window wash nozzle as claimed in claim 1, wherein the housing has stop surfaces, and the sliding piece has stop surfaces, wherein the stop surfaces of the housing interact with the stop surfaces of the sliding piece to limit the axial movement of the sliding piece.

9. A window wash nozzle for a vehicle, comprising: a housing in which a nozzle element with a liquid supply input connection is mounted so as to be pivotable about a pivot axis, an actuatable adjustment element for bringing about pivoting of the nozzle element, a sliding piece mounted in an axially displaceable manner in the housing, wherein the sliding piece interacts with the adjustment element such that actuation of the adjustment element brings about an axial displacement of the sliding piece, wherein a guiding cam is formed on the sliding piece and interacts with a transmission element such that the transmission element is adjusted in a direction transversely with respect to a direction of movement of the sliding piece during axial displacement of the sliding piece, wherein the transmission element acts on the nozzle element eccentrically with respect to the pivot axis of the nozzle element such that adjustment of the transmission element brings about pivoting of the nozzle element about the pivot axis.

10. The window wash nozzle as claimed in claim 9, wherein the adjustment element is an adjustment screw that is mounted in a rotatable and axially fixed manner in the housing, wherein the sliding piece has a thread which is in engagement with a thread of the adjustment screw and is mounted for rotation therewith and in an axially displaceable manner in the housing.

11. The window wash nozzle as claimed in claim 9, wherein the guiding cam is formed by a guiding groove formed on the sliding piece, and in that the transmission element is a transmission pin which is attached to the nozzle element eccentrically with respect to the pivot axis and is guided in the guiding groove.

12. The window wash nozzle as claimed in claim 9, wherein a retaining groove in which a projection of the housing is guided during an axial displacement of the sliding element is formed on the sliding piece.

* * * * *